United States Patent [19]

Brown et al.

[11] 4,392,081

[45] Jul. 5, 1983

[54] LIGHTING UNIT

[75] Inventors: Thomas A. Brown, Fulton; William Peil, North Syracuse, both of N.Y.

[73] Assignee: General Electric Company, Syracuse, N.Y.

[21] Appl. No.: 288,855

[22] Filed: Jul. 31, 1981

[51] Int. Cl.$^3$ ........................ H02K 17/34; H02P 1/54

[52] U.S. Cl. ........................................ 315/46; 315/92; 315/177; 315/276

[58] Field of Search ............... 315/121, 177, 290, 312, 315/323, 46, 276, 92

[56] References Cited

U.S. PATENT DOCUMENTS

| | | | |
|---|---|---|---|
| Re. 24,823 | 5/1960 | Popa | 315/205 |
| Re. 29,204 | 5/1977 | Snyder | 315/106 |
| 3,240,992 | 3/1966 | Hallay | 315/323 |
| 3,407,334 | 10/1968 | Attewell | 315/278 |
| 3,486,069 | 12/1969 | Mahler | 315/194 |
| 3,500,125 | 3/1970 | Moerkens et al. | 315/205 |
| 3,517,254 | 6/1970 | McNamara, Jr. | 315/91 |
| 3,536,954 | 10/1970 | Haymaker et al. | 315/98 |
| 3,611,432 | 10/1971 | Babcock et al. | 315/92 |
| 3,621,331 | 11/1971 | Barron | 315/207 |
| 3,659,146 | 4/1972 | Munson | 315/92 |
| 3,679,931 | 7/1972 | Powell | 315/177 |
| 3,693,045 | 9/1972 | Price | 315/91 |
| 3,737,730 | 6/1973 | Willis | 315/91 |
| 3,890,534 | 6/1975 | Horowitz | 315/92 |
| 3,927,348 | 12/1975 | Zawadski | 315/121 |
| 4,005,331 | 1/1977 | Horowitz | 315/92 |
| 4,047,076 | 9/1977 | McNamara, Jr. | 315/88 |
| 4,048,539 | 9/1977 | Walker | 315/176 |
| 4,060,751 | 11/1977 | Anderson | 315/209 |
| 4,091,307 | 5/1978 | McNamara | 315/92 |
| 4,103,209 | 7/1978 | Elms | 315/207 |
| 4,151,445 | 4/1979 | Davenport | 315/92 |
| 4,170,746 | 10/1979 | Davenport | 315/246 |
| 4,232,252 | 11/1980 | Peil | 315/92 |
| 4,232,252 | 11/1980 | Peil | 315/92 |

FOREIGN PATENT DOCUMENTS

| | | |
|---|---|---|
| 377937 | 7/1964 | Switzerland . |
| 444305 | 2/1968 | Switzerland . |

OTHER PUBLICATIONS

"High Intensity Discharge Lamps", General Electric Company Publication–1975.

*Primary Examiner*—Harold A. Dixon
*Attorney, Agent, or Firm*—Richard V. Lang; Carl W. Baker

[57] ABSTRACT

A lighting unit is described utilizing an energy efficient metal vapor arc lamp as the main source of light supplemented by a standby filamentary light source producing light when the arc lamp is being started. The lighting unit is designed as a more efficient replacement for the incandescent lamp. The lighting unit includes means for conversion of 60 hertz ac to dc, and a dc energized operating network, including a ferrite transformer and an intermittently operated switching transistor serially connected with a load consisting of the filament or the arc lamp, or both, to which regulated output power is provided. The operating network produces an output with minimum dissipation adapted to each operating state of the arc lamp, including the provision of a high ignition potential, adequate power for the lamp during the glow to arc transition, warm-up and ballasting. In addition, while the arc lamp is being started, the operating network provides power for lighting the standby filament.

26 Claims, 8 Drawing Figures

FIG. 3

| STATE OF LIGHTING UNIT | PREIGNITION | IGNITION AND GAT | WARM UP | FINAL RUN |
|---|---|---|---|---|
| DURATION | 0 SECOND MIN. 45 SEC-4 MIN. MAX. | <4 SECONDS | 30-45 SECONDS | —— |
| POWER INPUT (25 KHz) | 35 WATTS | 38 WATTS | 34-85 WATTS | 35 WATTS |
| ARC LAMP (11) | 1400V P-P<br>0 WATTS<br>0 LUMENS | 1400V-200V P-P MAX.<br>5 WATTS MAX.<br>NEGLIGIBLE LUMENS | 15V-70V<br>12-38 WATTS<br>LOW-FINAL LUMENS | 70V<br>32 WATTS<br>2500 LUMENS |
| FILAMENTARY LIGHT SOURCE (12) | 32 WATTS<br>320 LUMENS | 32 WATTS<br>320 LUMENS | 16-40 WATTS<br>150-400 LUMENS | 0 WATTS<br>0 LUMENS |
| | ARC LAMP INACTIVE | PHASE I-II | PHASE III | |

IONIZATION GLOW ESTABLISHED

THERMIONIC EMISSION ARC ESTABLISHED

FULL TEMPERATURE AND PRESSURE

FIG. 4

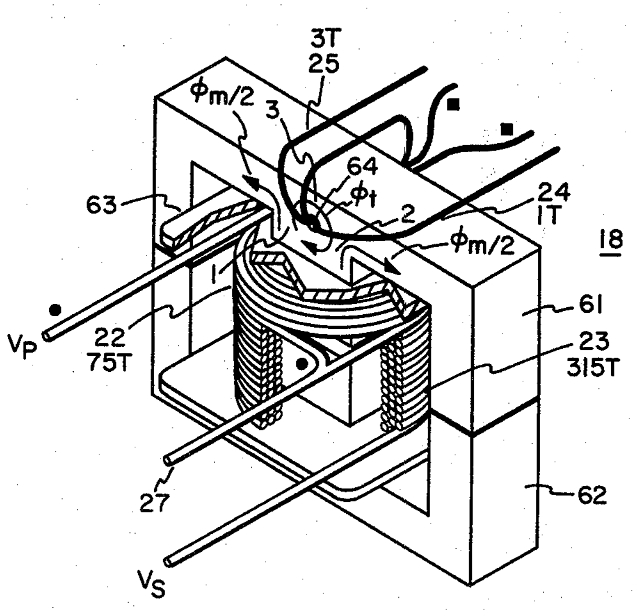

LIGHTING UNIT

BACKGROUND OF THE INVENTION

1. Field of the Invention

The present invention deals with a lighting unit designed for functional similarity to an incadescent light source, and more particularly with a lighting unit in which the principal source of light is an arc lamp supplemented by a standby filamentary light source, and which includes a compact "high frequency" power supply unit for supplying the needed energization from a conventional 120 volt 60 hertz source.

2. Description of the Prior Art

The present invention is an outgrowth of earlier efforts to produce an energy efficient and comparatively low cost replacement unit for the incandescent lamp. The incandescent lamp converts most of the electrical energy supplied into heat, a small percentage always less than 10% being converted into visible light. With the cost of energy rising, a need has arisen for a lighting unit whose conversion of electrical energy into light was substantially higher. Known lighting units such as fluorescent units have had double to quadruple the lighting efficiency of an incandescent light. A property of such devices, which has limited their more general application, has been the high initial cost of the ballast for powering such devices and their elongated configuration. Another possible alternative has been the high pressure discharge lamp having up to six times the efficiency of an incandescent lamp. High pressure metal vapor lamps have been available in high power units requiring costly power supplies, restricting their use to street lighting and commercial as opposed to home lighting. Recently, as disclosed in U.S. Pat. No. 4,161,672, smaller low wattage, metal halide lamps having efficiencies approaching those of the larger size have been invented. Such lamps are a potential energy efficient replacement for the incandescent lamp provided that convenient low cost provisions can be made for standby illumination and for supplying the diverse electrical requirements for the two light sources.

A prior solution to the problem of a replacement unit for an incandescent lamp is contained in the U.S. Pat. No. 4,232,252.

Another solution to the problem of a replacement unit for an incandescent lamp is contained in the cited application Ser. No. 47,972 filed June 13, 1979. The efficiency of the present arrangement is somewhat higher than that disclosed in the referenced Peil and McFadyen application.

The power supply of the present lighting unit represents an outgrowth of earlier high frequency power supplies in which a ferrite transformer, normally controlled for non-saturated operation, and a switching transistor are significant elements. Such power supplies have been termed static inverters in deference to the fact the "dc" quantities are converted to ac through static or non-moving parts. Patents dealing with inverters of this class and ferrite transformers having the saturation avoidance feature include the U.S. Pat. Nos. 3,914,680, 4,002,999, 4,062,390 and 4,004,251. U.S. Pat. No. 4,202,231 deals with a static inverter employing a single switching transistor in a blocking oscillator configuration and other related configurations.

The U.S. application Ser. No. 139,946 deals with a ferrite transformer having a saturation avoidance function of the type herein employed.

SUMMARY OF THE INVENTION

Accordingly, it is an object of the invention to provide an electrically energized light source of improved efficiency.

It is further object of the invention to provide an improved lighting unit utilizing an arc lamp.

It is another object of the invention to provide an improved light unit wherein the main source of light is an arc lamp supplemented by a filamentary lamp.

It is a further object of the present invention to provide a lighting unit wherein the main source of light is an arc lamp supplemented by a filamentary light source having an improved operating network.

It is still another object of the invention to provide an improved lighting unit combining a metal vapor lamp with a standby filamentary lamp which provides increased available power for the arc lamp during the glow to arc transition for more reliable starting.

These and other objects of the invention are achieved in a a novel lighting unit utilizing an energy efficient metal vapor arc lamp as the main source of light, supplemented by a standby filamentary light source. The lighting unit also includes a dc power supply and an operating network for converting 120 V 60 hertz energy into the forms needed for operating the main and standby lamp. The main lamp and standby filament are contained in a single glass enclosure and the dc supply and operating network are contained in a small case to which the glass enclosure is attached and which has an "Edison" base for inserting the lighting unit into a conventional lamp socket. In short, the novel lighting unit is functionally similar to an incandescent lamp but produces light with a more efficient use of power.

The dc power supply of the lighting unit comprises a rectifier, typically a bridge, for converting ac to dc and a capacitor for energy storage.

The operating network comprises a transformer, a switching transistor, a current maintenance diode, which supports current during the OFF intervals of the transistor switch, and means for repetitively turning on the transistor switch. These elements are interconnected to supply operating power to the filament lamp until the arc lamp is warmed up and both starting and operating requirements to the arc lamp. Switching means are provided responsive to the state of the arc lamp for turning off the filamentary lamp when the arc lamp approaches normal temperature and voltage.

The transformer is designed for operation at above audible frequencies and includes a core of substantially linear magnetic material forming a first, main magnetic path, aperture means defining a second toroidal magnetic path lying within the main magnetic path of lower reluctance than the main magnetic path, a first and a second power winding coupled to the main magnetic path, current flow in either power winding generating flux which has one sense in one segment and an opposing sense in a second segment of the second magnetic path, and a flux level dependent control means comprising a primary feedback winding and a secondary feedback winding passing through the aperture means and coupled to the second magnetic path.

The switching transistor is normally non-conductive and is connected to intermittently complete a current path through the primary feedback winding between one supply output terminal (normally B+) and a first node in the operating network.

The secondary feedback winding is coupled across the input electrodes of the transistor for application of an initial conduction aiding feedback after transistor turn-on, continuing until one segment of the magnetic path becomes saturated, and a conduction inhibiting feedback thereafter, returning the transistor to a non-conductive state after a certain ON time. Preferably, the switching transistor is a junction transistor, whose input junction is connected in a low impedance path across the secondary feedback winding.

The operating network further comprises a primary power circuit for operating the filamentary lamp. It comprises the first power winding and the filamentary lamp in series. The primary power circuit is connected between the node and the supply output terminal at reference potential.

A secondary power circuit is provided for starting and operating the arc lamp. It comprises the second power winding and the arc lamp in series. The secondary power circuit is also connected between the first node and the supply output terminal of reference potential. The second power winding provides transformed starting potentials when the primary circuit is active and operating potentials (not transformed) when the primary circuit is inactive.

The arrangement provides flexible selection of the output power levels to the arc lamp. When the switching transistor is turned on at the appropriate fixed rate, the desired power for the filament lamp and the arc lamp is provided, the operating network providing power regulatory action through automatic adjustment of the ON time and thereby the duty cycle of the switching transistor. More particularly, the core geometry and first power winding turns may be selected to provide a first regulated power level to the filamentary lamp when the arc lamp is off, and the core geometry and the second power winding turns may be selected to provide a second regulated power level to the arc lamp when the filamentary lamp is off. Similarly, the core geometry and effective combined power winding turns are selected to provide a third regulated power level to the filamentary and arc lamps when both are active.

When both lamps operate, the total power level may be selected, but it is subject to a further constraint in relative power levels between lamps. When the first power winding and the second power winding are connected to generate mutually opposing flux in the main path, the effective combined turns count represents an approximate difference in numbers of turns. In addition, dissimilar geometries become applicable because the main flux attributable to the first power winding adds to the primary feedback winding flux in one segment of the second low reluctance magnetic path in the core, while the main flux attributable to the second power winding adds to the primary feedback winding flux in a second, different segment of the second magnetic path. When both lamps are energized and both are drawing power during warm-up, the arc lamp exhibits a constant voltage load. This, together with the mutual coupling between the first and second power windings, fixes the power to the filamentary lamp in relation to the voltage of the arc lamp, and in practice both draw minimum power during early warm-up and both approach full power near the end of warm-up. Finally, the difference between first and second power winding turns is selected to provide an increased maximum total power level by reducing the effective power winding turns during the warm-up period. This measure permits a doubling of total power at the end of warm-up.

The arrangement provides both adequate power during the arc transition and adequate ignition voltage. The opposed winding senses tend to provide a small improvement in available power to the arc lamp for the glow to arc transition. A more significant improvement arises in optimizing the step-up turns ratio for adequate power transfer during this lamp state.

The means for switching off the standby filament is a silicon controlled rectifier responsive to the arc lamp voltage and connected in circuit with elements of the primary power circuit. The SCR is designed to be conductive during pre-ignition and to continue conducting until warm-up of the arc lamp is substantially complete. This is achieved by a diode in the sensing path to the gate electrode poled to permit circuit response only to negative potentials at the sensing connection. The sensing connection is the terminal of the first power winding remote from the node of the operating circuit. It should be remembered that the node cannot go negative with respect to reference potential of the dc supply because of the current maintenance diode coupled to that node. Negative potentials therefore can only occur at the sensing point, which is conductively connected through the first power winding to the node, when voltages are transformed from the second power winding to the first power winding during transistor turn-off. The transformed voltage is low during early warm-up of the arc lamp when the arc voltage is low but increases through the warm-up period as the arc voltage increases to the normal value. A zener diode in the gate circuit is provided to set the voltage threshold for SCR response corresponding to a near normal arc potential. A storage capacitor and series resistance in the gate circuit preclude accidental turn-off of the SCR from low energy transients occurring during the glow to arc transition.

BRIEF DESCRIPTION OF THE DRAWING

The novel and distinctive features of the invention are set forth in the claims appended to the present application. The invention itself, however, together with further objects and advantages thereof may best be understood by reference to the following description and accompanying drawings in which:

FIG. 3 is a table of four states of the lighting unit in the normal starting sequence which lists the states of the arc lamp, the standby filamentary lamp, the duration of each state, the corresponding energization requirements and lumen outputs.

FIG. 4 is an illustration of a ferrite transformer forming an essential element of the power supply unit.

Referring now to FIG. 1, a novel lighting unit for operating from a conventional low frequency (50–60

Figure 1:
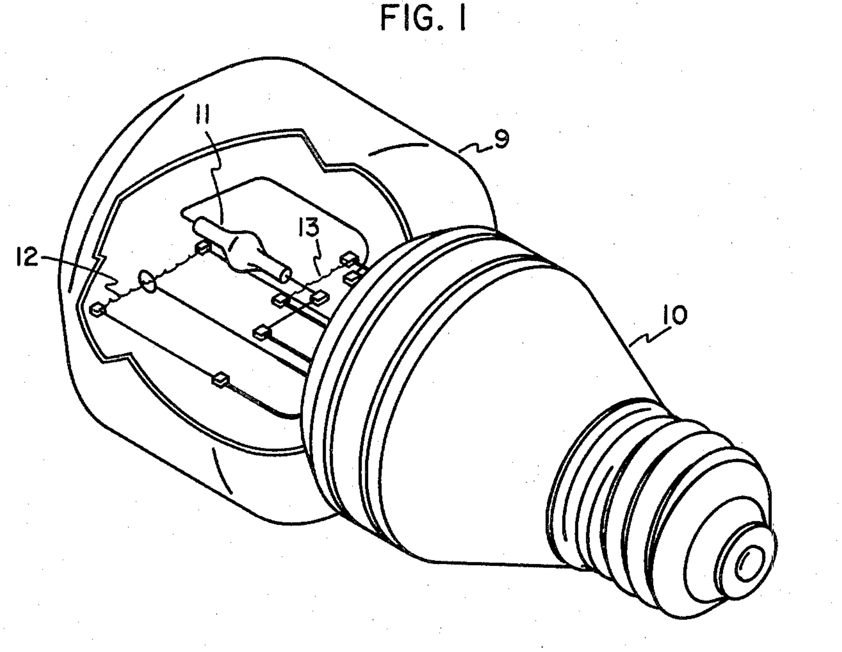
FIG. 1 is an illustration of a novel lighting unit suitable for connection to a standard lamp socket using an arc lamp as a principal light source, a standby light source and a compact power supply unit.

Hz) alternating current power source is shown. The lighting unit comprises the lamp assembly which produces light, and a power supply unit which supplies electrical power to the lamp assembly in suitable form for starting and operating the lamp. The lamp assembly includes a glass enclosure 9 which contains a high efficiency arc lamp 11 and a filamentary resistance 12 which becomes a supplemental incandescent light source. The power supply unit includes a rigid case 10 attached to the glass enclosure 9 and a screw-in base. The base provides both the electrical connection and mechanical attachment of the lighting unit to a conventional ac lamp socket.

The lighting unit provides an efficient and readily controlled light source which is economical in design and suited for household lighting. Efficiency in operating arises from the use of an arc lamp as the principal source of light. The light output in lumens per unit of electrical power of an arc lamp is typically 4 to 6 times greater than that of an incandescent lamp. When electrically efficient inductive ballasting is employed, as in the present unit, the efficiency is approximately equal to that of a home fluorescent unit. By the selection of a minimum number of low cost, mass produced parts, the initial cost of the unit is comparable to a conventional fluorescent unit. When compared to an incandescent lamp, the savings in power during the lifetime of the new lighting unit more than compensates for the higher initial cost.

The novel lighting unit, as seen in FIG. 1, has the dimensional convenience of an incandescent lamp. The power supply unit occupies the space between the screw-in base and the lamp assembly. In an incandescent lamp, this space corresponding to the neck of the lamp is normally allocated to the filament supporting structure. The glass enclosure 9 of the lamp assembly is approximately cylindrical. The lighting unit has approximately the same height and maximum diameter as an incandescent lamp. Light projection of the unit is over a solid angle slightly less than that of an incandescent lamp being reduced from a full sphere by the angle subtended by the power supply unit.

The lighting unit may be switched on, restarted or turned off with the same convenience as an incandescent lamp. The delays in production of light normally attendant upon the starting of an arc lamp have been made less objectionable by the use of the supplemental incandescent element 12, packaged within the enclosure 9. In all stages of main lamp operation, and particularly during starting, light will be produced by the lamp assembly and will originate from the same approximate location. This feature is of particular interest for the half minute periods that it may take for the arc lamp to reach full brightness after a cold start or the longer periods required for a hot restart.

The disposition of the elements of the lamp assembly are best seen in FIG. 1. The arc lamp 11, and the incandescent element 12, are installed inside the glass enclosure 9. The elements 11 and 12 are supported on leads sealed into the base of the lamp assembly. The gas filling the enclosure 9 is an inert gas suitable for a conventional incandescent lamp. The arc lamp 11 is shown with the positive electrode or anode down (near to the base) and the negative electrode or cathode up (remote from the base). The two electrodes are in turn sealed into the ends of a small quartz vessel whose outer contour is cylindrical except for a small central region of larger cross section, of less than ½" in diameter. The interior of the arc lamp, which is not specifically illustrated, contains a spherical or elliptical central chamber filled with an ionizable mixture: argon, an ionizable starting gas, mercury, which is vaporized when hot, and a vaporizable metal salt such as sodium and scandium iodides. When operating, an arc is formed between the electrodes which creates illumination throughout the chamber. Small, low power lamps of the type just described are referred to as metal halide or metal vapor lamps. A suitable lamp is more fully described in the earlier cited Cap and Lake patent. In a typical embodiment, the light output of the arc lamp is 2200 lumens, slightly less than that of a 150 watt incandescent lamp, and the output of the standby filament is 320 lumens, corresponding to that of a 35 watt incandescent lamp.

A further feature of the lighting unit is the protection against accidental ultraviolet emission. The discharge is normally productive of substantial quantities of ultraviolet illumination. Since the electrode temperatures in the arc lamp must be quite high, the enclosure must be of quartz. Quartz permits higher temperature operation but also transmits ultraviolet. Ultraviolet emission is then prevented by the use of a glass enclosure which is absorptive of ultraviolet. In the event that the glass enclosure is fractured, the possibility for continued operation of the arc lamp and continued radiation of ultraviolet is precluded by the serial connection of the arc lamp with a resistive filament 13. The filament is operated at a sufficiently high temperature during lamp operation that any destruction of the protective atmosphere as by a fracture of the glass enclosure destroys the filament, preventing further lamp operation. Thus, the user is protected from ultraviolet emission in the case of fractures of the glass shielding by extinction of the main lamp.

The arc lamp exhibits several distinct states in conventional use and each active state requires distinct energization. From a practical viewpoint, the arc lamp has three active states denominated Phases I-III and an inactive state.

In Phase I, "ignition" occurs. The duration of ignition is normally no longer than a second or two and often much shorter. It is the time required for a suitably high voltage to cause "electrical breakdown" of the gas contained in the arc lamp to initiate a falling maximum lamp voltage. This latter condition is also referred to as the establishment of a "glow discharge." For purposes of definition, ignition is to be distinguished from pre-ignition. Pre-ignition is an interval preceding ignition, whose duration is predictable for a given arc lamp and power supply unit, and is the period during which ignition is improbable, normally due to non-optimum physical conditions in the lamp. Pre-ignition will be discussed below.

The ignition period consists of a delay period constituting most of the ignition period, distinguishable in principle from the pre-ignition period, and the much shorter microsecond-millisecond duration rise time associated with the initial discharge. The ignition delay assumes that the lamp is at standard ambient conditions, and is a period having a statistical average value, which by design is no longer than a second or two. The ignition delay is partly attributable to the random, isolated, natural creation of ions which instantaneously reduce the potential of the discharge, and is partly attributable to the nature of the ignition voltage. Should the ignition potentials be sustained, a lower ignition delay is predicted than for pulsed ignition, and a lower voltage may be used. When the ignition voltage is pulsed, a coincidence between the applied voltage and random spontaneous ionizations will define the ignition instant. The probable time delay for such a coincidence will increase as the duration of the ignition pulse shortens.

As indicated above, the ignition delay should be less than a second or two for practical certainty in starting. An increase in the ignition potentials, or an increase in the duration of the ignition pulse will shorten the ignition delay. In the event that minimum voltage and minimum duration ignition pulses are desired, irradiation of the arc lamp from a second light source can produce a drop of several hundred volts in the required voltage and facilitate the substitution of ignition pulses of a microsecond duration for a more sustained dc potential.

The rise time of the discharge is the short terminal portion of ignition. The arc lamp will break down at the 1000–2000 volt ignition voltage, causing a sudden drop in lamp voltage to typically 15 volts and then the lamp may re-fire a second time, generally at a lesser voltage as the ionization level of the contained gases increases and entrance is made to the "glow to arc transition." In Phase I, lamps of the design herein contemplated require 1000 to 2000 volts using pulses of microsecond duration for ignition. The power required for the ignition period is small.

Phase II—the glow to arc transition—extends from one-tenth of a second to perhaps two seconds and is characterized by a more sustained ionization level and a lower maximum voltage. As Phase II begins, the discharge is typically unstable, swinging between a maximum and a minimum value, with the voltage of the discharge falling continually toward a lower maximum with a recurring minimum near 15 volts. As the average level of gas conduction increases, the maximum lamp voltage falls, the consumed power increases, and the temperatures inside the lamp also increase. As the maximum arc voltage falls through values near 200–400 volts, a more substantial energy (typically 2–4 watts) is required by an arc lamp of the metal vapor type.

Phase III begins with the establishment of the "arc" which occurs when a portion of the cathode has reached thermionic emission temperatures. At the marked transition from Phase II to Phase III, the voltage of the discharge loses its unstable quality and holds to an initial value of about 15 volts. In Phase III, a sustained low lamp impedance is exhibited, and a current limiting ballast is required to prevent excessive heating. At the beginning of Phase III, the lamp dissipation is set at between 10 and 15 watts and significant light production starts.

The warm-up period, which is the initial portion of Phase III, normally lasts from 30–45 seconds. During the warm-up period, the arc lamp reaches full operating temperature and the contained gases reach their high, final operating pressures. The voltage across the lamp increases to a value of typically 70 volts with an accompanying reduction in lamp conductance. When the final run condition occurs, the lamp absorbs maximum power (typically 32 watts) and the maximum light output is produced.

The pre-ignition period is a variable period having a nominal minimum value of zero at standard ambient conditions and a maximum value between 45 seconds and 4 minutes if there has been a failure of the arc and a hot restart is required. If the arc lamp is de-energized in the course of normal operation, the lamp will be at an elevated temperature and at a high gas pressure for a short while. To restrike the arc when the lamp is hot, the potential required may be in excess of an order of magnitude more than for a cold start (e.g., 10–30 KV). The thermal time constants of the lamp are such that the time required for cooling from a hot operating condition to the point where a conventional (1–2 KV) voltage will restrike an arc may be from 45 seconds to 4 minutes.

Supplemental illumination is particularly important to the user during warm-up and the pre-ignition period for a hot restart. Assuming a normal cold start, pre-ignition and ignition last for a second or two and because the arc discharge lamp is producing neglible light, standby illumination is desirable. The glow to arc transition period approaches two seconds and supplemental illumination is desirable for the same reason. During warm-up, which lasts from 30–45 seconds, the light output of the discharge lamp increases from a very low value to the normal value and initial supplemental illumination, is essential. In the final run condition, supplemental illumination should remain off. Should a hot restart be required, the period required for restoration of an arc may take up to 4 minutes, and supplemental illumination is also essential.

Figure 2:
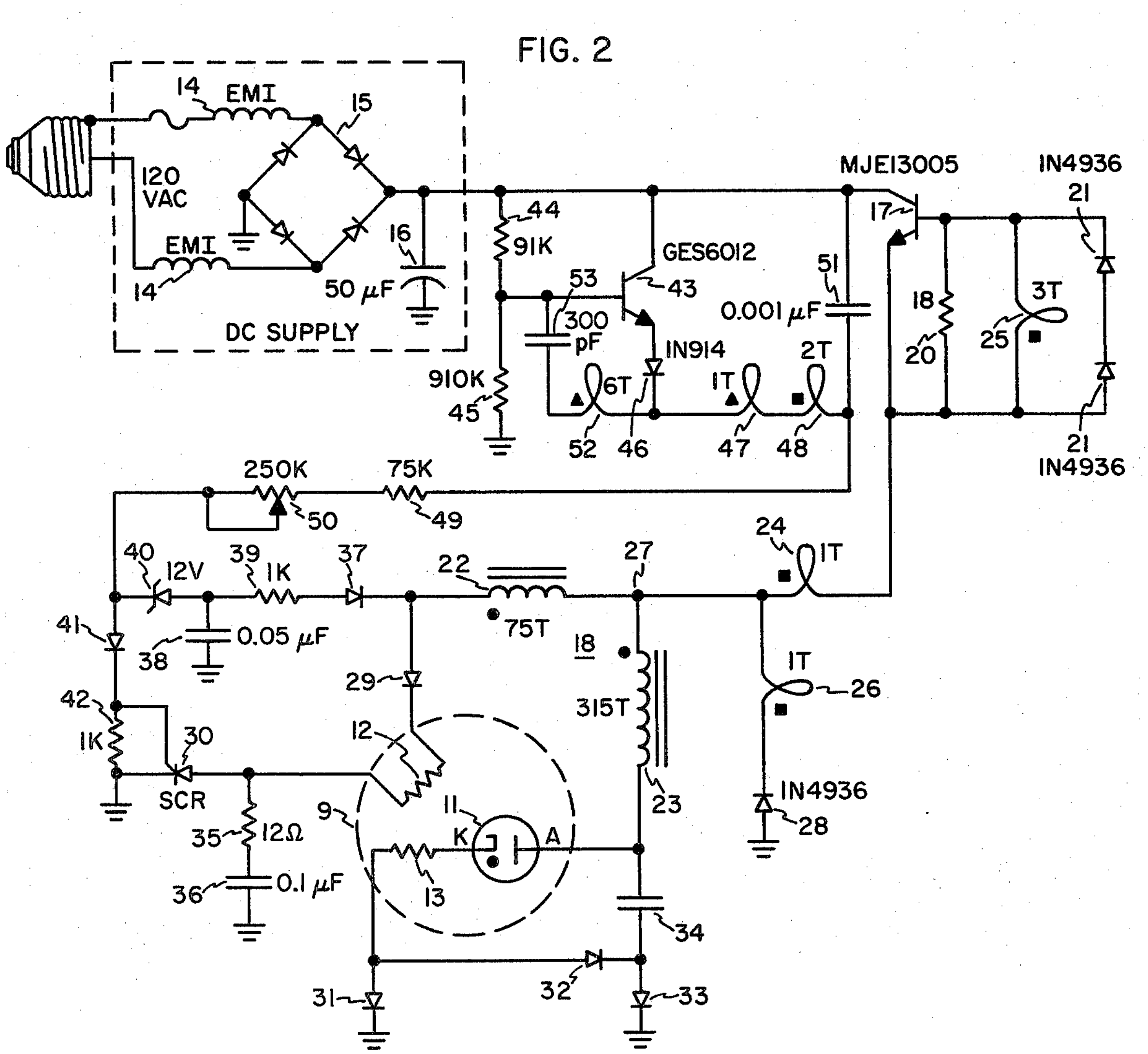
FIG. 2 is an electrical circuit diagram of the lighting unit.

Suitable operating power for the arc lamp and the filamentary lamp is provided by the power supply illustrated in FIG. 2. When the arc lamp is in the final run condition, the dc power supply voltage is approximately 155 volts and the power input is 35 watts. The filament lamp is OFF, and the voltage at the arc lamp is 70 volts with an operating power of 32 watts, as earlier noted.

In pre-ignition and ignition, a succession of high frequency unidirectional pulses with a high frequency alternating component are generated by the switching action. The unidirectional pulses provide power to the filamentary lamp. At the same time, the alternating component, which includes the current flow through the filamentary lamp, appears in a transformer primary, is transformed and rectified, and applied to the arc lamp for ignition. The ignition voltage is typically at 1600 V peak to peak and at a low power level.

In the glow to arc transition, high frequency power for standby illumination continues and the power available for the arc lamp, as the arc voltage maximum drops through a 200–400 volts range, is held at approximately 5 watts. Maintaining adequate power in this voltage range insures a reliable transition of a metal vapor lamp to warm-up operation.

When warm-up occurs, high frequency power continues initially to both the arc lamp and the filamentary lamp, the latter continuing to produce a supplemental light output. The initial dissipation in the arc lamp is held to about 12 watts as the arc voltage falls to about 15 volts and power to the filament is reduced to about 16 watts. As warm-up continues, power to the arc lamp reaches 38 watts and power to the filamentary lamp increases to 40 watts just before turn-off.

The lighting unit whose electrical circuit diagram is illustrated in FIG. 2, has as its principal components the arc lamp 11, standby and protective filaments 12, 13, a dc power supply (14, 15, 16) for converting the 120 volt 60 Hz to dc, and an operating network (17–53) for converting electrical energy supplied by the dc power supply into the forms required for operation of the lamp assembly. The lighting unit has four active conditions characterized by the states of the discharge lamp, the standby light source, and the operating network. These states, which summarize the preceding discussion, are illustrated in FIG. 3.

The dc power supply circuit of the lighting unit is conventional. Energy is supplied from a 120 volt 60 hertz ac source via the base and two emi filters 14 to the ac input terminals of a full wave rectifier bridge 15. The positive output terminal of the bridge becomes the positive output terminal of the dc supply and the negative output terminal of the bridge becomes the common or reference output terminal of the dc supply. The filter capacitor 16 is connected across the output terminals of the dc supply to provide energy storage and reduce the ac ripple. The output of the dc power supply during normal run operation of the arc discharge lamp 11 is 155 volts at about ¼ amperes average current, producing an output power of approximately 35 watts of which 32 watts is expended in the lamp. The power required of the dc power supply by the lighting unit during a hot restart is approximately 35 watts and the maximum required during warm-up of the arc discharge lamp is approximately 80 watts.

The operating network derives power from the dc supply and in turn supplies high frequency energy to the lamp assembly for operating the arc lamp and the standby filament as earlier stated. Two principal portions of the operating network are the power circuit which comprises the elements 17–42 and the trigger oscillator which comprises elements 43–53.

The power circuit comprises a power transistor 17, passive components 20 and 21 associated with the power transistor; a step-up transformer 18 consisting of windings 22, 23, 24, 25, 47, 48, 52; a voltage doubler circuit comprising diodes 31, 32, 33 and a capacitor 34; an SCR 30, which controls the condition of the power circuit and passive components 35 through 42 generally associated with SCR 30.

The power circuit may be treated in an approximate manner as having four principal portions; a triggered monostable solid state switch, a primary power circuit, a secondary power circuit and a control circuit. The portions are not separable in all respects, since certain elements are shared. For instance, the power transformer 18, which is the subject of earlier cited copending application Ser. No. 969,381, is an essential element in the trigger oscillator, the primary and the secondary power circuit. The triggered monostable switching transistor controls energy supplied from the dc source to a load consisting of the primary and secondary power circuits, and these in turn energize the standby filament and the arc lamp respectively. The control circuit modifies the mode of energization supplied, by turning off the standby filament as a step function of the sensed state of the arc lamp.

The power transformer 17 is associated with the step-up transformer 18 and passive components 20, 21 and the diode 28 in achieving triggered monostable switching operation. The power transistor 17 has base, emitter and collector electrodes. The power transformer 18 has a ferrite core for high frequency operation (typically 25 kilohertz; i.e. above audibility), a primary power winding 22, a secondary power winding 23, a primary control winding 24, a secondary control winding 25 and a resetting control winding 26, all associated with the core. The control windings provide a transistor conduction control whose sense is responsive to the magnetic state of the ferrite core and provides monostable action, avoiding full core saturation.

The switching transistor 17 controls current from the dc source (14, 15, 16) into the primary and secondary power circuits. The primary and secondary power circuits are both connected to anode 27 and both are returned to the common dc terminal. The collector of the power transistor 17 is connected to the positive terminal of the dc source and the emitter is connected through the primary control winding 24 to the node 27, thus completing a path for current from the dc source to the primary and secondary power circuits when transistor 17 is conducting. A resistance 20, the secondary control winding 25 and a two diode series string are each connected in shunt with the input junction of transistor 17. The secondary control winding 25 provides the means for turning on the transistor 17, through application of a trigger pulse from the trigger oscillator. The winding 25 also provides a conduction aiding feedback to the transistor 17 as a result of transistor current flowing in the primary control winding 24. This feedback, as will be explained, reverses when a certain flux level is achieved in the core and helps to provide monostable operation. The diodes 21 are protective diodes arranged to prevent application of an excessive reverse voltage to the input junction from control winding 25. The load for the switching transistor contains substantial inductive elements. Accordingly, to protect the switching transistor from excessive voltage surges and to allow current to flow after turn off has been completed, a current maintenance diode 28 is provided connected through a resetting control winding 26 to the node 27. In normal operation, the transistor 17 is turned on by the trigger pulse for a predetermined interval, dependent on the magnetics, and current is supplied to the load(s) connected to node 27. When the transistor 17 is turned off by the feedback reversal, the diode 28 whose anode is coupled to the common supply terminal and whose cathode is coupled via winding 26 to node 27, permits current to continue to flow until the inductive elements in the load have discharged their stored energy. The switching mechanism provides effective power regulation, and assuming suitable inductive reactances, provides stable ballasting in both the warm-up and final run phases of the lamp operation.

The primary power circuit is so-called because of its association with the primary power winding 22. During starting, the primary power circuit supplies both high frequency energy for directly operating the standby filamentary lamp 12 and high frequency energy, which after transformation in the secondary winding 23, provides high voltage for starting the arc lamp 11. During normal operation, the primary power circuit is quiescent as a result of sensed circuit conditions which turn off SCR 25. The primary power circuit consists of the main primary winding 22 of the power transformer, the diode 29, SCR 30 and passive components 35, 36. More particularly, the undotted terminal of the primary power winding 22 is connected to the node 27 while the dotted winding terminal is connected to the anode of diode 29. The cathode of diode 29 is connected to one terminal of the supplemental filamentary lamp 12. The other terminal of the lamp 12 is connected to the anode of SCR 30. The cathode of the SCR is returned to the common dc terminal. A "snubbing" resistance 35 and capacitance 36 are provided, serially connected across the principal electrodes of SCR 30. These are provided to prevent the SCR from firing improperly from "dV/dT" triggering. When the SCR 30 is conducting, a current path for high frequency energy is closed in the primary power circuit. When the SCR 30 is nonconductive that current path is open. The state of the SCR 30 is determined by the control circuit to be discussed below.

The secondary power circuit is associated with the transformer secondary power winding 23. During starting, the secondary power circuit derives energy from the primary power circuit and provides transformed voltages which (after doubling) are applied to start the arc lamp. During normal operation of the arc lamp, the secondary power circuit derives its high frequency current directly from the switching transistor 17, the transformer secondary also providing additional reactive ballasting and filtering of the energy supplied to the arc lamp.

The secondary power circuit consists of the secondary power winding 29 of the power transformer, the diodes 31, 32, 33 and capacitor 34. More particularly, the undotted terminal of the secondary power winding 21 is connected to the anode of the arc lamp 11. The cathode of the arc lamp is connected through a fuse element 13 to the anode of diode 31, the cathode of which is coupled to the common source terminal. Weak voltage doubling action is provided by a capacitor 34 and diodes 31, 32, 33. Capacitor 34 has one terminal coupled to the anode of the arc lamp and the other terminal connected to the cathode of diode 32. The anode of diode 32 is connected to the anode of diode 31. The cathodes of diode 32 is connected to the anode of a third diode 33, of which the cathode is connected to the common dc source terminal.

The power circuit is completed by the control circuit whose principal function is to turn on the SCR during start to allow supplemental illumination and to turn off the SCR when warm-up is established and supplemental illumination is no longer needed. In turning off the SCR, the control circuit responds to a negative voltage developed at the dotted terminal of the winding 22 in the primary power circuit which is a measure of arc lamp voltage. When the negative voltage exceeds a given threshold, further conduction by the SCR is prevented. The control circuit comprises a positive voltage blocking diode 37, a capacitor 38, resistance 39, a threshold setting zener diode 40, diode 41, and resistance 42. The cathode of diode 37 is connected through resistance 39 to the anode of zener diode 40. The cathode of zener diode 40 is connected to the anode of diode 41, the cathode of which is coupled to the gate of the SCR 30. The filter capacitor 38 is connected between the anode of the zener diode 40 and the common dc supply terminal. A current by-passing resistor 42 is connected between the gate and cathode terminals of SCR 30.

The operating network is completed by the trigger oscillator which comprises the elements 43-53. The trigger oscillator is the subject of U.S. Pat. No. 4,258,338 mentioned earlier. The trigger oscillator is a relaxation oscillator having magnetically coupled regenerative feedback essential to the production of a high intensity short duration trigger pulse and a biasing configuration which makes the pulse repetition rate insensitive to variations in the dc supply voltage or load. The trigger pulse recurrently turns on the main switching transistor 17.

The trigger oscillator consists of an NPN transistor 43 having its collector electrode connected to the positive terminal of the dc source and its base electrode connected to a voltage divider consisting of the resistances 44 and 45 connected in the order recited between the positive dc supply output terminal and the common output terminal. The emitter of transistor 43 is connected to ground through a series circuit consisting of diode 46, primary feedback winding 47, the trigger pulse output winding 48, resistances 49, 50, diode 41 and resistance 42, respectively. A capacitor 51 is provided coupled between the terminal of the resistance 49 remote from the common source terminal and the positive source terminal. Secondary feedback winding 52 is capacitively coupled by capacitance 53 across the series connected transistor (43) input junction and the diode 46.

The pulse generator functions as a relaxation oscillator with the capacitor 51 being recurrently charged through the series path made up of elements 49, 50 41 and 42, and recurrently discharged when transistor 43 conducts. In the charge-discharge process, the voltage on the lower terminal of the capacitor 51 falls slowly from near B+ to a value of typically 15–40 volts below B+ at a charge rate established by the series charging resistance, (49, 50, 41, 42), the size of the capacitor 51 and the B+ potential. At the desired minimum voltage, the transistor becomes conductive, arresting the downward drop in voltage. Since the transistor is connected across the capacitor terminals, conduction brings the lower capacitor terminal to a potential slightly (e.g. 2 volts) below B+. The two volt difference is equal to the sum of the voltage drop in transistor 43 (when conducting), the voltage drop in diode 46, and the voltage drops in the transformer windings 47 and 49. When the discharge through transistor 43 stops, the charging through the series charging resistance repeats.

The charge of the capacitor 51 is arrested when the transistor 43 becomes conductive at a voltage set by the base connected voltage divider 44, 45. The emitter electrode, which is connected through the diode 46 and the low impedance windings 47 and 48 to the lower terminal of capacitor 51, follows the potential of the lower capacitor terminal as it falls. The base electrode, however, which is connected to the voltage divider 44, 45 connected across the dc source, is maintained at an arbitrary fraction of the B+ potential (about 15–40 volts below B+). Thus, the transistor input junction varies from a strong (15–40 volts) backward bias precluding conduction when the capacitor begins to charge, to an eventual forward bias causing the transistor to become conductive again. Transistor conduction halts the charging of capacitor 51 with an abrupt discharge. Transistor conduction occurs when the lower terminal of the capacitor 51 is approximately two diode drops below the voltage of the base of transistor 43.

With the effective regeneration provided by windings 47, 52, full transistor conduction takes place very quickly. Current flows through the transistor 43, the diode 46 and windings 47 and 48 in a closed path carrying current from the upper to the lower terminal of the capacitor 51. The current flowing in primary feedback winding 47 induces a regeneratively sensed base drive in the secondary feedback winding 52. The feedback causes a very sudden increase in current in the transistor, permitting the capacitor to discharge quickly. The discharge through output winding 48 induces a pulse of from 0.5 to 1 ampere having a duration of approximately 200 nanoseconds in the secondary feedback winding 25. This pulse turns on the main switching transistor 17.

The repetition rate of the trigger oscillator, typically 25 KHz, is substantially independent of variation in the B+ voltage. This implies independence of variations in the source voltage or in the loading. Once the capacitor 51 is discharged, the rate of charge is a function of the size of capacitor 51, the series charging resistance and the applied dc voltage. The voltage through which the capacitor must charge before discharge again occurs is also substantially proportional to the B+ potential. The potential which establishes the range of the voltage swing is the voltage applied to the base electrode of transistor 43 by the voltage divider 44, 45, and it is proportional to the full supply voltage. From this it may be seen that if the source voltage is high, the charging rate is more rapid and the voltage range through which the capacitor must charge is also greater. Similarly, if the B+ falls, the charging rate falls and the voltage range through which the capacitor must charge is also reduced. In both cases, the time required for charging between successive discharges is substantially the same.

The pulse generator herein described produces very high current (0.25 to 1 ampere) pulses of short 100–500 nanoseconds) duration. Pulses of this intensity and duration are required for efficiently turning on the type MJE 13005 power switching transistor (17) herein employed.

The power transformer 18 employed in the operating network is shown in FIG. 4. It consists of the core structure 61, 62, the windings 22, 23, 24, 25, 26, 47, 48 and 52 and a bobbin 63 by means of which the windings (22, 23) are supported on the core structure. More particularly, the core comprises two E cores 61, 62 arranged into an "8" core configuration with air gaps at each of the three joints. A pair of apertures 64 and one not shown in FIG. 4 are provided, respectively, in the upper and lower E cores. These apertures are located at the base of the central leg in each E core.

The primary and secondary power windings are wound on the bobbin, the latter installed around the center leg of the core and fitted inside the two openings. The secondary winding 23 and the primary winding 22 are wound on the bobbin so as to maintain the senses illustrated in FIG. 2.

The control windings 24, 25, 26, 47, 48 and 52 are associated with the apertures. The control windings 24, 25, 26 and 48 (not shown in FIG. 4) associated with the upper aperture 64 provide means for coupling the trigger pulse from the trigger oscillator to the switching transistor as required to initiate each conduction cycle. The control windings 47 and 52 (not shown in FIG. 4) are associated with the lower aperture and provide the regenerative feedback required for operation of the trigger oscillator.

The control windings 24 and 25, which are wound through the upper aperture 64 and about the upper portion of the upper E core, provide a mechanism for monostable transistor operation. If the transformer 18 is connected to the transistor 17 in the manner generally illustrated in FIG. 2, with the secondary control winding coupled across the input junction of a switching transistor and the primary control winding and the primary power winding connected to carry collector current, and further assuming a trigger pulse to initiate transistor conduction, then conduction will occur for a short period and terminate. The result is the production of an approximately rectangular output waveform with high overall efficiency.

The control windings 24, 25 provide monostable operation by supplying feedback to the transistor which reverses in sense when the flux level in the core increases past a certain point. This sensitivity of the feedback to flux level is due to the geometry of the magnetics associated with the apertures 64, 65. Each aperture may be treated as bounded by three contiguous regions, each defining a flux path, and collectively forming a small virtual toroid. The first region (marked 1 in FIG. 4) of the upper aperture 64 provides a path between the central leg and the upper left portion of the upper E core; the second region (marked 2) provides a path between the central leg and the upper right portion of the upper E cores; and the third region (marked 3) provides a path between the upper left and upper right portions of the upper E core, using the orientations of FIG. 4.

Let us assume that initially there is little main flux, as is true at the beginning of each transistor conduction cycle, and that a small amount of current is flowing through the switching transistor and causing current flow in the primary control winding 24. Under these conditions, the flux due to the winding 24 is established in the three regions which collectively form a magnetic toroid surrounding the primary control winding. (Let us assume that in the showing of FIG. 4, the control flux pursues a clockwise path consecutively through regions 1, 3, and 2.) The secondary control winding 25 passes through the same aperture and is coupled to the primary control winding through the same magnetic toroid. The secondary control winding is connected to the input junction of transistor 17 in a sense such that feedback produced between the two windings tends to turn on the transistor more strongly. The configuration employs at most a few turns for each control winding so as to produce a current transformer action. Normally additional secondary turns are provided to "force" the current gain or beta of the transistor.

With conduction in the transistor established, the main flux increases. With increased main flux, the influences producing eventual transistor turn off are initiated. The main flux attributable to the main power winding 22 will have the same sense in the central leg and will pursue clockwise and counterclockwise senses around the two major magnetic loops formed by the "8" magnetic structure. If one assumes that the main power winding 22 is wound in a sense that the flux is counterclockwise in the lefthand loop and clockwise in the righthand loop of the "8" core, as seen in FIG. 4, then one will find the following growing unequality in the flux levels in the three regions associated with the aperture. In the first region of the toroid, the control flux attributable to the primary control winding 24 and the main flux flowing in the lefthand loop will add and the total flux level there will be greatest. In the second region of the toroid, the circulating flux due to the control winding and the main flux flowing around the righthand loop of the E core will subtract and the total there will be smaller than in the first region. In the third region, substantially no main flux will flow, and the region will contain only circulating flux attributable to the primary control winding. The flux there will also be smaller than in the first region.

As the main flux continues to increase, a point will be reached at which saturation will occur, and if the hole is properly located on the center line of the central leg and inset from the outer surface, the first region to saturate will be region one. When region one saturates, any incremental current increase in the primary control winding will no longer occasion an incremental flux increase in the low reluctance path defined in the magnetic toroid encircling the aperture. Instead, the incremental flux will be forced to pursue the longer high reluctance path around the outer legs of the "8" core, which includes the two outer air gaps. When the region one saturates, a change in drive is found to occur. The secondary current waveform, which may have been at a substantial forward value, roughly constant with time, now experiences sharp downward change in slope, leading initially to a reduction in forward drive and then a reversal in drive. The reversal in drive continues until stored charge is completely removed from the switching transistor, and it is turned off completely.

The reversal in sense described above, which occurs when region one saturates, is more fully described in the earlier cited application Ser. No. 139,946. The phenomenon may be treated analytically taking into account the current flowing in the primary and secondary windings which create opposing fields in the toroid and the nature of the transistor load. The drive reversal may be explained as the joint result of the sudden increase in reluctance coupling the two windings; the constant voltage effect of the transistor input junction acting with the inductance of the secondary winding to constrain the rate of change in flux in the third region to a constant value so long as conduction continues in that transistor; and the stored charge at the junction, which provides energy to support a reverse current flow until removal of the stored charge completes the transistor turn off. The useful consequence is that the transistor is automatically turned off prior to full saturation of the core, leading to increased transistor switching efficiency and increased transistor reliability. In addition, the amount of ferrite material required for a predetermined output power may be reduced.

The windings 48 and 25, which are associated with the upper aperture 64, and which couple the trigger pulse from the trigger oscillator to the switching transistor 17, operate as a simple current transformer. Since less main flux is present when the trigger pulse is generated, these two windings are closely coupled to the magnetic toroid surrounding the aperture and are unaffected by later events. Similarly, the regenerative feedback windings 47 and 52 of the trigger oscillator associated with the lower aperture, provide simple current transformer action, also being active when the main flux is small.

The winding 26 associated with the transistor switching mechanism is used to force an extended reset of the flux at the end of each conduction cycle to allow greater core usage in the toroidal region when the next trigger pulse is applied.

Without winding turn 26, the flux in region 3 (toroidal flux $\phi_t$) will reset to the remanent flux $B_R$, a property of the ferrite selected. The addition of winding 26 causes the current passed by the current maintenance diode 28 to provide a magnetomotive force to reset the toroidal flux beyond the remanent state. So long as the toroidal flux is not reset past a zero flux state, the main flux is less than B max. when saturation occurs. The desired effect of the winding 26 is to force a larger "initial" main flux to meet the duty cycle constraint on the main winding $$\left( \int_t^{t+T} \phi_m \, dt = 0 \right).$$

Region 2 saturates at $B_{max}$, a property of the ferrite. Since the duty cycle is determined by the need for equal volt-time areas as just mentioned, and $\phi_m$ is controlled by load voltage, a greater main flux at saturation requires a greater main flux at transistor turn-on (initial main flux). This directly requires a higher current to support this flux and more power is thereby provided to the load. This increase in power is delivered at a minimum frequency of operation, resulting in improved efficiency due to decreased switching losses. In consequence, the operating margin available for load and line voltage variations is increased at the operating frequency. This operating margin relates to the ability to provide a given wattage to the arc lamp under low line voltage conditions. This is an alternative to increasing the frequency of operation to provide a larger margin of protection.

In a practical embodiment of the present invention, the winding counts are as illustrated in FIG. 2 and the core has the external dimensions of 30 mm long×26 mm wide×11 mm deep, the aperture having a diameter of 2.6 mm spaced 2.4 mm from the outer surface. The air gaps at each of the joints is approximately 0.009". The outer legs are 5 mm in thickness and the center leg is 11 mm in thickness. The E cores are made by the TDK Electronics Co., Ltd. of H7C2 ferrite material having a configuration catalog No. EE30Z modified by the introduction of the aperture. The bobbin is designed to fit within the openings of the Figure "8" core with the windings being wound in a layered manner between the upper and lower plates of the bobbin.

The operating network whose principal portions have now been described, produces the energization for the arc lamp and the filamentary light source summarized in the table of FIG. 3. Commencing with the first energization of the lighting unit and continuing through the four listed states of the lighting unit, the trigger oscillator produces trigger pulses at a substantially constant 25 KHz rate. The monostable solid state switch, which is coupled to the trigger oscillator, switches at the same 25 KHz rate. Switching provides high frequency energization for operation of the primary and secondary power circuits during all four states of the lighting unit.

The operating network adapts to the varying energization needs of the lighting unit by several load responsive mechanisms. In particular, the primary power circuit is active when standby illumination is needed during starting and is inactive when standby illumination is not needed during normal operation. The change of the primary power circuit from an active to an inactive state is effected by the solid state switch (SCR 30) controlled by the control network in response to a voltage sensed in the power circuit, in turn dependent upon voltage of the arc lamp.

A further adaptive response of the operating network is through the power regulation property of the solid state switch. The power regulation level has three values, which are affected by the SCR switch condition and load condition as indicated in FIG. 3. In addition, power regulation is responsive to electrical conditions in the lighting unit in each state.

A further adaptive response of the operating network is in the use of a "collapsible" voltage doubler, which in response to differing arc lamp loading permits both high voltage during ignition and a high power during the glow to arc transition.

A description of the states of the lighting unit and the adaptive responses of the operating network will be taken up with reference to FIGS. 3 and 5-D.

In the pre-ignition state, the arc lamp is as yet unfired and standby illumination is necessary. The control network insures that the primary power circuit is active. When power is initially turned on, the self-starting trigger oscillator commences the production of trigger pulses, activating the monostable solid state switch (transistor 17). The monostable solid state switch then intermittently applies the B+ potential to the node 27. Simultaneously with the first trigger pulse, an enabling current is applied to the gate of the SCR 30 through the serially connected resistances 49, 50, and diode 41 from the capacitor 51. The lower terminal of capacitor 51 (i.e., the terminal not connected to B+) is at zero potential before energization of the operating network, and is brought to near B+ potential by conduction of transistor 43. This potential drifts downward with time under the influence of the charge path presented by the resistances 49, 50, diode 41 and the resistance 42 shunting the SCR gate. The downward drift in voltage is typically halted at 14 volts below the B+ bias by conduction of the transistor 43. The charge path for the capacitor is of high impedance (typically 185K ohms), supporting a current of 1.25 milliamperes, with one portion of the current flowing in the gate shunt resistance 42 and the remainder into the gate to sustain the SCR. With the voltage on the capacitor 41 remaining high and a minimum gate current on the order of a milliampere available, the SCR is "enabled" to conduct at any instant that the SCR anode voltage becomes positive.

The pre-ignition state is shown in the first column of FIG. 3 with the operating network providing power to the standby filament and ignition potentials to the arc lamp. In this state, the SCR 30 is enabled through the high impedance trigger oscillator path; the monostable solid state switch (transistor 17) is intermittently conductive as a result of periodically applied trigger pulses and the arc lamp has not yet broken down. More particularly, conduction by the monostable solid state switch 17 applies the B+ potential intermittently to the node 27. This applies the B+ potential across the primary power circuit comprising the primary power winding 22, the diode 29, the filamentary resistance 12 and the SCR 30. The SCR 30 turns on, completing a low impedance path for current through the primary power winding 22 and the standby filament 12 to ground. The pulsating current flowing in the filamentary resistance 12, raises its temperature and commences the production of standby illumination.

Simultaneously, with the provision of current in the standby filament, a transformed voltage is induced in the secondary winding for arc lamp ignition. At the start of each conduction interval of switch 17, the upward voltage step across the primary winding 22 is from reference to B+ potential. Simultaneously, a positive voltage step proportional to the turns ratio times B+ (to which B+ is also added) appears at the undotted terminal of the secondary winding for ignition:

$$V_s = +\frac{N_s}{N_p}(B^+) + B^+ \quad (1)$$

where
$N_s$ is the secondary turns,
$N_p$ is the primary turns, and
B+ is typically 155 volts.

The secondary voltage, typically 800, appearing at the undotted terminal of the secondary winding is applied to the anode of the arc lamp. When conduction starts, the voltage at the dotted end of the primary winding 22 steps upward and decays, subject to the L/R time constant given by the ratio of the inductance of the primary winding (L) to the resistance of the filament 12. Similarly, the voltage at the dotted end of the secondary winding, steps to the peak and then decays to B+ subject to a like time constant, as shown in FIG. 5(*a*).

When switch conduction stops by the monostable action earlier described, energy stored in the inductance 22 sustains current flow. The current maintenance diode 28 now provides an alternate path for the current into the node 27 and clamps the node to reference potential. The voltage at the dotted terminal of winding 22, subject to the L/R time constant, drops from B+ to ground. The voltage at the undotted terminal of secondary winding 23 then drops, subject to the same L/R time constant, to the negative transformed B+ value also as shown in FIG. 5(*a*). The clamping effect of diode 28 once the transistor switch 17 turns off, removes the B+ offset:

$$V_s = -\frac{N_s}{N_p}(B+) \quad (2)$$

In the secondary power circuit during pre-ignition, an ignition voltage reflecting the difference between the positive and negative peaks is applied across the arc lamp. The diodes 31, 32, 33 and capacitor 34 do not interfere with application of the positive secondary potential to the anode of the arc tube. The capacitor 34 is small and the diode 32 is reversely biased to preclude substantial energy absorption from the positive peak. The negative peak from a prior cycle is coupled through capacitor 34, forward biased diode 32 and resistance 13 to the cathode of the arc tube. The diodes 31 and 33 are both back-biased, and so do not dissipate the negative peak. The intrinsic capacity in diode 31 together with other stray capacity at the cathode of the arc lamp, serves to store charge for short intervals. Thus, charge deposited by the negative secondary peak from an earlier conduction cycle is stored by this stray cathode capacity, with some diminution for leakage, and the cathode potential is established at a negative value somewhat less than the negative peak value. Thus, the secondary power circuit applies an approximate peak to peak pre-ignition potential of 1400 volts across the electrodes of the arc tube as shown in FIG. 5(*a*).

During pre-ignition, the SCR 30 remains conductive, keeping the primary circuit active, since primary voltage ($V_p$) conditions do not permit turn off. During pre-ignition, the potential at the dotted terminal of the inductance 22 alternates from a substantially positive value to a close to zero value. This potential does not go negative so long as the secondary winding in the secondary power circuit is in series with a lamp in a high impedance state and negligible bias voltage is developed across the secondary winding. The diode 37 at the input to the control circuit accordingly remains back-biased, precluding application of any primary voltage to the control circuit such as might turn off the SCR 30 and inactivate the primary power circuit.

During ignition and the glow-to-arc transition, the wave shapes are generally similar to those illustrated in FIG. 5(*a*) with some modification produced by the increasing loading of the arc lamp. During these periods the arc lamp initially breaks down and its impedance erratically decreases. In ignition, the arc voltage varies between a decreasing maximum voltage (~1000 volts) and a relatively fixed minimum voltage (~15 volts). In the glow-to-arc transition, the erratic nature of the arc may continue while the maximum voltage is reduced to two or three hundred volts. (When the arc stabilizes at the minimum voltage, the GAT has finished and warm-up has begun.) The decrease in arc lamp impedance in ignition and early GAT forces a collapse of the negative peak established for the cathode of the arc lamp by the diode capacitor network 31–34, and demands substantial power (e.g. 5 watts at 250 volts) from the primary circuit, at less voltage and higher current than before, which the operating network is able to do, attributable in part to its intrinsic constant power properties.

During ignition and glow to arc transition, the control voltage remains positive keeping the SCR on. Throughout these first two periods, the arc voltage exceeds the B+ bias voltage except for the short intervals of an erratic breakdown, precluding the application of a prolonged voltage across the secondary winding having a sense to develop a negative voltage in the primary winding. The resistance-capacitance filter (39,38) at the input to the control network prevents unwanted response during a transient.

In the 30–45 second arc lamp warm-up period standby illumination is desirable. The voltage conditions in the primary power circuit at the beginning of warm-up instrumental in continuing SCR conduction and standby illumination are illustrated in FIG. 5(*b*). In this period, the arc voltage is steady, starting initially at approximately 15 volts and then gradually climbing toward the final value of 70 volts. The upper waveform illustrates the upward voltage step at the node 27 from approximately reference potential to B+ potential, when transistor conduction starts and then the downward step to reference potential as transistor conduction ends. The duration of conduction is shorter than during earlier periods due in part to the constant power effect of the transfluxor. The voltage limits are the same as before. The FIG. 5(*b*) waveform next below is a slightly idealized version of the voltage applied to the secondary winding. The upward step (B+−15), is transformed to the primary winding by the turns ratio ($N_p/N_s$) and offset by the B+ potential. More particularly, the maximum positive voltage at the dotted terminal of primary power winding 22 during early warm-up is as follows:

$$V_p = B+ + \frac{N_p}{N_s}(B+ - 15) \tag{3}$$

The corresponding negative voltage goes below reference potential by a related transformed quantity:

$$V_p = 0 + \frac{N_p}{N_s}(-15) \tag{4}$$

Using the indicated turns ratio, the negative voltage swing of approximately 4 volts at early warm-up is substantially less than the zener threshold (+12 volts), precluding a change in the enablement of the SCR gate, and continuing SCR conduction.

As warm-up proceeds, the arc voltage climbs toward the operating value of 70 volts. The zener threshold is selected so that at some point prior to attaining the final run voltage, the transformed negative voltage, as shown in FIG. 5(*c*), will exceed the zener threshold and turn off the primary power circuit and with it standby illumination. With the indicated parameters, this point occurs near 40 volts of arc voltage, but may be adjusted to occur at any desired point below the final run voltage. When the zener threshold is exceeded, current supplied by the high impedance supply circuit involving resistances 49 and 50, is diverted from the SCR gate and SCR conduction is precluded. With the SCR gate disabled, the primary power circuit is interrupted, precluding further energization of the standby filament and further voltage transformation from the primary to the secondary circuit.

Once turned off, the SCR control circuit will remain off indefinitely through normal operation. The diode 37 permits response to the negative going potentials developed during off time in normal operation. The capacitor 38 is charged to this negative voltage. The value of the capacitor (38) is set to be great enough so that during the entire transistor on time, the oscillator current is shunted away from the SCR gate and a negative voltage is maintained exceeding the previously mentioned zener threshold. This prevents the SCR 30 from obtaining gate current and turning on throughout normal run operation.

The monostable switching transistor acts as a power regulator with three distinctive regulatory modes. Treated generally, the duty cycle is determined by localized saturation in the transfluxor due to the combination of main flux and toroidal flux in a magnetic path (e.g. 1 or 2) near the aperture 64. The toroidal flux at the start of conduction increases at a fixed rate, clamped by $V_{be}$. The main flux is proportional to the collector current and increases according to the voltage across the power winding creating the main flux. For a low impedance load developing a low voltage drop, $\dot{\phi}_m$ will be larger, requiring the collector current to develop more rapidly, turning the transistor off sooner. The duty cycle decreases with collector current increase tends to maintain constant power, the power (assuming a constant voltage) being proportional to the collector current and the ON time.

As will be shown, the power regulative action operates in three different modes. It assumes one mode during starting, when the main flux in the magnetics is attributable to current flow in the primary power winding 22 and region 1 saturates; a second mode during normal, final run operation when the main flux is attributable to current flow in the secondary power winding 23 and region 2 saturates; and a third mode during early warm-up when appreciable currents flow in opposite senses in both main power windings with region 2 normally saturating.

As pre-ignition begins, the power supply tends to supply constant power to the load presented by the primary power circuit. This sets the power input through pre-ignition, ignition and the glow to arc transition at about 38 watts of which 32 watts is expended in the filamentary light source. Absorption of power by the arc lamp is negligible in pre-ignition, remains very small through ignition, and amounts to a few watts (approximately 5) during the glow to arc transition. The existance of arc lamp current side by side with filamentary current affects the regulatory action, and permits some useful increase in power to the arc lamp during the GAT period. The GAT period is sufficiently short so that the effect is not large. Earlier, at the instant that the pre-ignition begins, the regulatory action of the switching transistor supplements by the inductance of winding 22 prevents application of excessive power to the filament before it has reached operating temperature. The application of excess power to the filament due to either an increase in line voltage or a decrease in load impedance during prolonged starting is also prevented.

During normal final run operation, the power supply tends to supply constant power to the load presented by the secondary power circuit. After turn-off of the current through the primary power winding 22, which occurs just before normal operating voltage is achieved, the remaining current path is through the secondary power winding. The secondary power winding, as the dotted notations indicate, is wound in a reverse sense to the primary power winding about the core and thus causes an inversion in the sense of the main flux. With this inversion, region 2 rather than region 1 saturates. During normal operation, the duration of the conduction intervals is about the same as during the pre-ignition period, and the power inputs are approximately equal. The length of the duty cycle varies in response to excessive power demand from the arc lamp or excessive line voltage to regulate the power supply at a typical 35 watt dissipation. The inductance of the secondary power winding, acting upon the switched output of the monostable solid state switch, provides additional ballasting and filtering. With the cathode remaining at approximate ground, a substantially filtered waveform having 15%-20% ripple at the switching rate appears at the anode of the arc lamp 11, as shown in FIG. 5(*d*).

The power dissipation of the arc lamp and filamentary lamp during warm-up is listed in the FIG. 3 table. At the beginning of warm-up, a period which lasts for some 30-45 seconds, the voltage of the arc lamp drops to steady minimum value of approximately 15 volts and the initial dissipation is 12 watts. In the low voltage condition, the arc lamp would absorb excessive power and its lifetime would be shortened if power regulation were not present. As warm-up ends, the arc voltage climbs to 70 volts, the power climbs to 38 watts, and the tendency to absorb excessive power lessens—but regulation continues. The filament lamp absorbs about 16 watts at early warm-up, with the power increasing to 40 watts as warm-up ends (and the filamentary lamp is extinguished). As will be seen, the filamentary power is also regulated. The total power consumption to both lamps starts at 34 watts in early warm-up and increases to 85 watts by the end of the warm-up period, with regulation holding the total dissipation to the indicated values.

During warm-up, the power regulation is in a different manner permitting both the power variations noted, and the higher maximum power. In part, the change in the regulatory action during warm-up is due to the fact that the currents in the primary and secondary power windings are in opposite senses so that the maximum flux levels in the core, which define the transistor on time, are representative of less than the sum of the currents in the two power circuits. In other words, greater total current and greater total power is permitted when load currents flow in opposite senses in the two power windings.

In addition, due to the close inductive coupling between primary and secondary windings, the dissipations in the primary and secondary power circuits are not independent. More particularly, the arc lamp during warm-up exhibits a constant voltage load characteristic representable by a nearly ideal voltage source with a small series resistance. The presence of that voltage in the secondary power circuit acts as a constraint upon the power in the primary power circuit. The arc voltage is minimum (e.g., 15 volts) during early warm-up and monotonically increases to a normal run value (e.g., 70 volts) through warm-up. As a result of these influences, the total power to the filament and to the arc is least (34 watts) during early warm-up, and greatest (85 watts) at the end of warm-up.

Analytically, equality in the flux enclosed by the two power winding forces equality in the volts per turn. Since the power windings 22 and 23 both encircle common core structures, their volts per turn ratios are equal, neglecting leakage flux:

$$\dot{\phi}_{pri} = \dot{\phi}_{sec} = \frac{V_{pri}}{N_{pri}} \cong \frac{V_{sec}}{N_{sec}} = K \tag{5}$$

Thus, the voltages ($V_{pri}$, $V_{sec}$) applied respectively across the primary and secondary power windings are subject to a common constraint. The arc lamp in the secondary power circuit may be considered to be a slowly time varying voltage source, whose voltage corresponds to the instantaneous arc lamp voltage. It may be regarded as establishing the "K" in expression (5):

$$K \cong \frac{B^+ - V_L}{N_S} \tag{6}$$

where $V_L$ is the arc lamp voltage now referenced to "ground," and the other secondary circuit quantities of expression (5), $$\frac{V_{sec}}{N_{sec}} = \dot{\phi}_{sec} \cong K \tag{7}$$

and also the primary circuit quantities of expression (5)

$$\frac{V_{pri}}{N_{pri}} = \dot{\phi}_{pri} \cong K \tag{8}$$

Figure 5A:
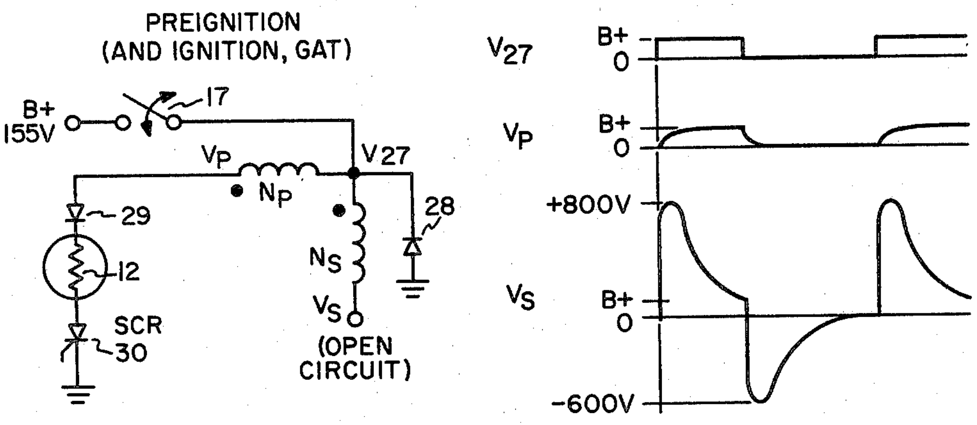
FIGS. 5(*a*), 5(*b*), 5(*c*) and 5(*d*) are explanatory illustrations of the operation of the power supply unit at four representative conditions, each figure showing a simplified equivalent circuit diagram of the power supply unit at the condition represented and waveshapes relevant to that condition.
Figure 5B:
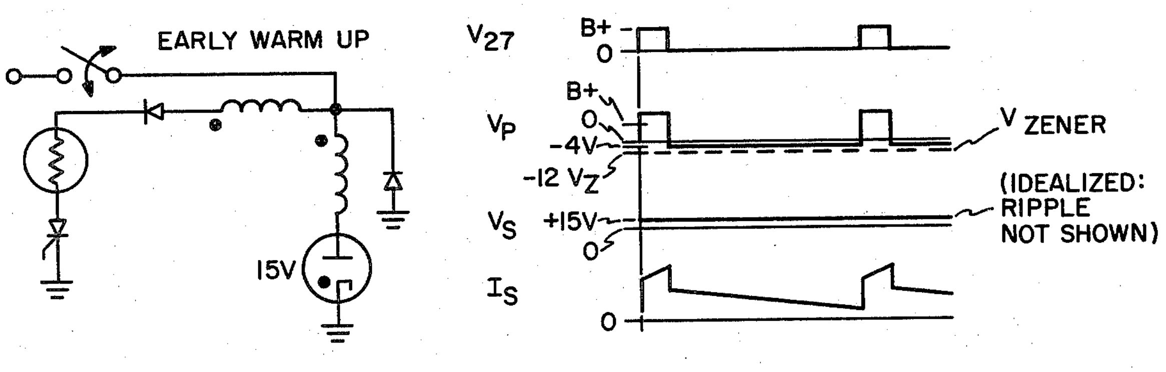
Figure 5C:
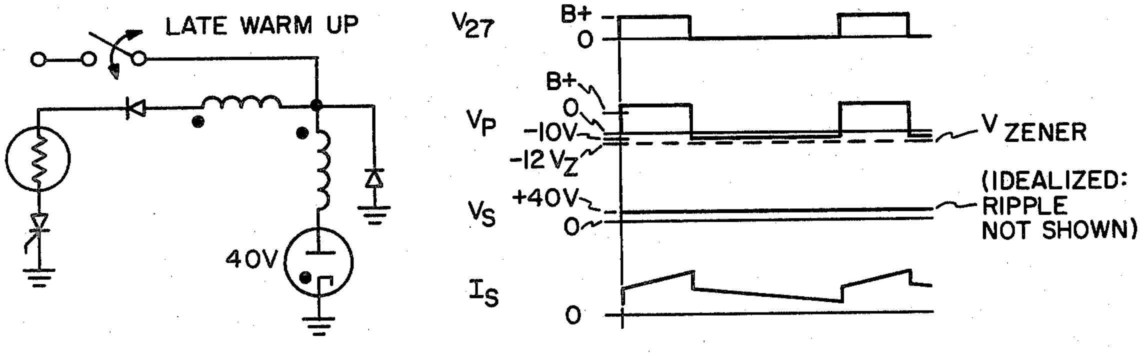
Figure 5D:
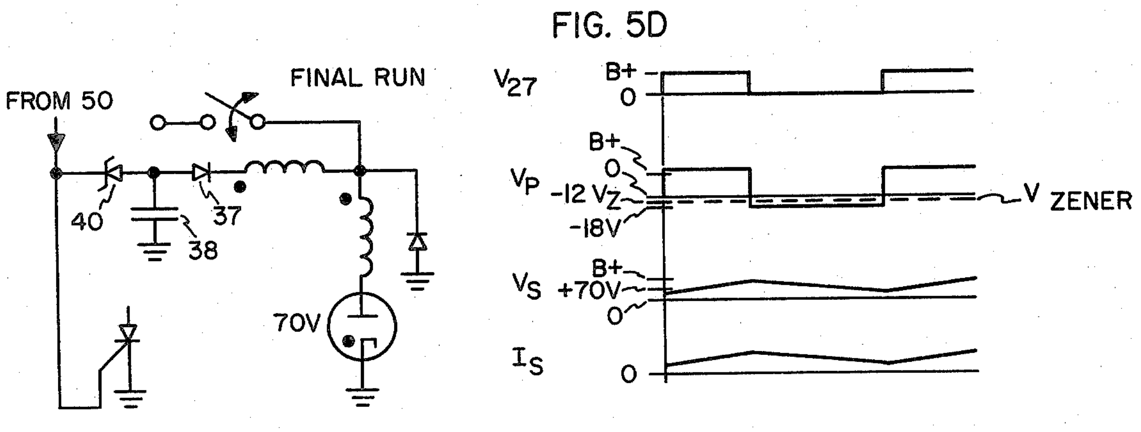

Substituting the values of expression (6) into (8) to find the voltage $V_p$ on the primary winding, now referenced to ground, as shown in FIG. 5A:

$$V_p = B^+ + N_{pri}\left(\frac{B^+ - V_L}{N_{sec}}\right) \quad (9)$$

The primary power is determined as follows:

$$P_{12} = \frac{V_p^2}{R_{12}}\left(\frac{t_{on}}{T}\right) = \frac{1}{R_{12}}\left[B^+ + \frac{N_{pri}}{N_{sec}}(B^+ - V_L)\right]^2 \frac{t_{on}}{T} \quad (10)$$

with the quantity $T_{on}/T$ being the duty cycle of the switching transistor 17. Expression (10) implies that the power in the primary power circuit is proportional to the ratio of the primary voltage squared ($V_p^2$) to the filament resistance ($R_{12}$). Similarly, the current in the primary power circuit is proportional to the ratio of the primary voltage ($V_p$) to the filamentary resistance ($R_{12}$). Analyzing expression (10) further; all quantities are fixed but $V_L$ and the duty cycle ($t_{on}/T$). With some simplification, the duty cycle may be shown to be a simple function of the arc voltage.

$$\frac{t_{on}}{T} \cong \frac{V_L}{B^+} \quad (11)$$

Therefore, the arc voltage $V_L$ enters the expression for $P_{12}$ when equation (11) is factoral into equation (10). Thus, the predominant influence of the arc lamp voltage is to be essentially a first order effect on the filament power, when the relative magnitudes of the other parameters in equation (10) are more carefully considered. Thus both the primary power and primary current are direct functions of the arc voltage ($V_L$).

The transfluxor is sensitive to the total flux in the region near aperture 64 where the flux components consisting of $\phi_t$ (i.e., the toroidal flux) and $\phi_m$ (i.e., the main flux) add. In establishing the main flux, any current that flows in the primary power circuit requires a corresponding increase in the current in the secondary power circuit to achieve the "same" flux level. Thus, the collector current and load power reach values which are higher when both power circuits are active (i.e., warm-up) than when only one power circuit is active, (i.e., final run operation). The duty cycle is determined by the rate of change of main flux $\dot{\phi}_m$ (controlled by arc lamp voltage, initial flux levels), and $\dot{\phi}_t$, the latter being controlled by $V_{BE}$ of the switching transistor. The duty cycle is controlled primarily by arc voltage since the other constraints are relatively constant as implied by expression (11). The arc voltage also controls initial flux ($\phi_m$) levels. This is so primarily because the arc voltage controls the decrease in $\phi_m$ during the OFF time. The effect of the constant rate of change of toroidal flux ($\dot{\phi}_t$) is to cause the level of main flux ($\phi_m$) necessary for saturation to be a linear function of time, decreasing as time continues. This tends to increase the main flux saturation level as the duty cycle decreases, thereby increasing the required current, and acting to achieve greater regulation.

In summary, during warm-up the arc lamp becomes a "zener" type load, and the switching transistor regulates both the power into the filament arc lamp and into the arc lamp. The filamentary current is determined by the instantaneous arc voltage and its resistance and is so constrained to reasonable values. At the same time the power into the arc lamp, whose voltage is the primary independent variable, is also regulated. Regarding the arc lamp by itself, regulation of the power as opposed to the current is particularly desirable since the current is allowed to increase usefully, perhaps two or three times at the minimum voltage levels and the warm-up process is "accelerated" without adverse effect. The composite effect of the oppositely directed primary and secondary windings is to allow filament current to continue during the warm-up period without reducing that available for the arc lamp.

The power supplied to the filamentary lamp during pre-ignition may be determined in the following approximate manner, assuming approximately square wave operation. During the period that the transistor switch 17 is on, the current to the filament is as follows:

$$I_f = \frac{B^+}{R_{12}}\left(1 - e^{-\frac{L22t}{R12}}\right) \quad 0 \leqq t < t_{on} \quad (12)$$

For the balance of the period, when the transistor is off, the filamentary current is as follows:

$$I_f = \frac{B^+}{R_{12}}\left(e^{-\frac{L22(t-ton)}{R12}}\right) \quad t_{on} \leqq t < T \quad (13)$$

(assuming $L_{22}/R_{12} << T$)

The filamentary power is $I^2_f R_{12}$ averaged over the period T. The ON time ($t_{on}$) is determined by transformer properties and the current given above. In pre-ignition, region 1 saturates due to both main flux and toroidal flux.

$$\phi_m = \frac{N_p I_f}{R_m} \quad (14)$$

$$\phi_t = \frac{N_{24} I_f}{R_t} \quad (15)$$

where $R_m$ and $R_t$ are, respectively the reluctances of the main flux path and of the toroidal path. When the sum of these fluxes cause the maximum flux density to equal $B_{sat}$ in region 1, saturation occurs, transistor turn-off starts, and the ON time is determined. Since the reluctances $R_m$ and $R_t$ are determined by core geometry, the filamentary power is determined by both core geometry and the number of turns.

Assuming that $L_{22}/R_{12}$ is substantially less than T, and assuming a given core configuration, the power to the filament is an inverse first order function of the number of primary turns ($N_{pri}$) because the flux $\phi_m$ is proportional to $N_p I_f$ which determines $t_{on}$ and in turn the duty cycle. This is consistent with an assumption of square wave conduction. So long as the condition specified continues, altering $L_{22}$ by changing the turns does not appreciably alter the current and thus does not increase the effect on power to a higher than first order inverse dependency.

The power supplied to the arc lamp in final run operation may be determined in a somewhat different manner, assuming a triangular rather than rectangular current waveform. The arc voltage ($V_L$) determines the duty cycle:

$$\frac{t_{on}}{T} \cong \frac{V_L}{B+} \quad (16)$$

The maximum flux ($\phi_{max}$) at saturation is determined by the core geometry and now involves region 2 rather than region 1 due to the inverse sense of winding 23. At the instant of turn-on ($t=t_{on}$)

$$\phi_{max} = \phi_{m\ max} + \phi_{t\ max} \quad (17)$$

$\phi_{max}$ is directly proportional to $I_{L\ max}$ of the arc lamp.

$$\phi_{m\ max} = \frac{N_s I_{L\ max}}{R_m} \quad (18)$$

$$\phi_{t\ max} = \frac{N_{24} I_{L\ max}}{R_t} \quad (19)$$

The current waveform is then referenced to this maximum current point with slopes increasing to it and decreasing from it. The slopes are determined by the volts per turn during the respective ON and OFF times of the transistor switch 17. The power to the arc lamp is then the product of $V_L$, (a relatively fixed voltage) times this current. As shown by expression (18), assuming a fixed $\phi_{m\ max}$, the current is an inverse first order function of the secondary turns ($N_s$). Since the voltage of the arc lamp is approximately constant, the power is also an inverse first order function of the secondary turns. The order of the dependency of power on secondary turns is diminished by both $\phi_{t\ max}$, which is a component of $\phi_{max}$ and the effect of altering $N_s$ on the $\phi_m$ quantities. More secondary turns reduce the slopes and more turns tend to increase the average current when secondary turns increase because the maximum current reference is fixed. This reduces the dependency of arc lamp power on the reciprocal of the number of secondary turns to somewhat less than a first order.

By proper choice of the number of turns $N_s$ $N_p$, the difference in turns ($N_s-N_p$) and proper core geometry (the cross sectional areas of regions 1 and 2 and air gaps in the outer main flux paths) different power levels can be set for pre-ignition, run and warm-up operation. Assuming other variables are constant, increasing the primary turns ($N_p$) decreases pre-ignition power to the filamentary lamp; increasing secondary turns, decreases final run power to the arc lamp; and increasing the difference between secondary and primary turns ($N_s-N_p$) decreases the power to both circuits during the glow to arc transition and warm-up. (As earlier noted, using opposite sensed primary and secondary windings permits an increase in power to both circuits during the glow to arc transition and warm-up in relation to the pre-ignition and final run periods.) Manufacturing convenience normally dictates that the apertures be centrally located with regions 1 and 2 having equal cross sections. Should additional adjustment range be sought between primary and secondary circuit power, adjustment of the air gaps in the outer legs of the main flux path provides a convenient adjustment of the reluctances ($R_m$).

What is claimed is:

1. A lighting unit comprising:

A. a dc power supply having two output terminals,

B. a filamentary lamp and an arc lamp,

C. an operating network comprising:

(1) a transformer having (a) a core of substantially linear magnetic material forming a first, main magnetic path, aperture means defining a second magnetic path lying within said main magnetic path of lower reluctance than said main magnetic path, (b) a first and a second power winding coupled to said main magnetic path, current flow in either power winding generating flux which has one sense in one segment and an opposing sense in a second segment of said second magnetic path, and (c) flux level dependent control means comprising a primary feedback winding and a secondary feedback winding passing through said aperture means and coupled to said second magnetic path, (2) a normally nonconductive switching transistor connected to intermittently complete a current path through said primary feedback winding between one said supply output terminal and a node;

said secondary feedback winding being coupled across the input electrodes of said transistor for application of an initial conduction aiding feedback after transistor turn-on, continuing until one segment of said magnetic path becomes saturated, and a conduction inhibiting feedback thereafter, returning said transistor to a nonconductive state after a certain ON time, (3) a primary power circuit for operating said filamentary lamp comprising said first power winding and said filamentary lamp in series, connected between said node and the other said supply output terminal, (4) a secondary power circuit for starting and operating said arc lamp comprising said second power winding and said arc lamp connected in series between said first node and said other supply output terminal, said second power winding providing transformed starting potentials when said primary circuit is active, (5) current maintenance means connected in circuit with said power windings for allowing current flow in said power windings during the transistor OFF time, (6) switching means responsive to the state of said arc lamp for inactivating said primary power circuit when the arc lamp is warmed up, and (7) means for repetitively turning on said switching transistor.

2. A lighting unit as set forth in claim 1 wherein said transistor is a junction transistor, whose input junction is connected in a low impedance path across said secondary feedback winding.

3. A lighting unit as set forth in claim 2 wherein said repetitive turn-on means operates at a fixed rate, which is selected in relation to said ON time to provide the desired power for the filament lamp and arc lamp, said operating network providing power regulatory action through the duty cycle of said switching transistor.

4. A lighting unit as set forth in claim 3 wherein the core geometry and first power winding turns are selected to provide a first regulated power level to said filamentary lamp when said arc lamp is quiescent, and said core geometry and said second power winding turns are selected to provide a second regulated power level to said arc lamp when said filamentary lamp is quiescent.

5. A lighting unit as set forth in claim 3 wherein the core geometry and first power winding turns are selected to provide a first regulated power level to said filamentary lamp when said arc lamp is quiescent, and said core geometry and said second power winding turns are selected to provide a second regulated power level to said arc lamp when said filamentary lamp is quiescent, and said core geometry and effective combined power winding turns are selected to provide a third regulated power level to said filamentary and arc lamps when both are active.

6. A lighting unit as set forth in claim 5 wherein said first power winding and said second power winding are connected to generate mutually opposing flux in said main path, the main flux attributable to the first power winding adding to the primary feedback winding flux in one segment of said second magnetic path, and the main flux attributable to the second power winding adding to the primary feedback winding flux in a second, different segment of said second magnetic path to make dissimilar core geometries respectively applicable when said filamentary and arc lamps are sequentially active.

7. A lighting unit as set forth in claim 3 wherein said arc lamp exhibits a constant voltage load during warm-up and wherein said first and second power windings have sufficient mutual coupling to fix the power to the filamentary lamp in relation to the voltage of the arc lamp during warm-up when both lamps are energized.

8. A lighting unit as set forth in claim 7 wherein said first power winding and said second power windings are connected to generate mutually opposing flux in said main path, the difference between first and second power winding turns being selected to provide an increased maximum total power level by reducing the effective second power winding turns during the warm-up period when both filamentary and arc lamps are active.

9. A lighting unit as set forth in claim 3 wherein said first power winding and said second power winding are connected to generate mutually opposing flux in said second power winding turns being selected to provide an increased power level to said arc lamp by reducing the effective second power winding turns during the glow to arc transition when both filamentary and arc lamps are active.

10. A lighting unit as set forth in claim 3 wherein said turn-on means is a separate trigger oscillator.

11. A lighting unit as set forth in claim 10 wherein said current maintenance means is a diode.

12. A lighting unit as set forth in claim 11 wherein said flux level dependent control means includes a reset winding passing through said aperture means and coupled to said second magnetic path, said winding being connected in series with said current maintenance diode in a sense to reset said core beyond the natural remanent state at the end of each transistor conduction interval, to increase the efficiency of said power supply by allowing a lower frequency of operation for a given core size.

13. A lighting unit as set forth in claim 12 wherein said switching means comprises a silicon controlled rectifier having a gate electrode conductively coupled to said node for response to arc lamp voltage, and wherein said silicon controlled rectifier is connected in series with said first power winding and said filamentary lamp to activate said primary power circuit during preignition and continuing until warm-up of said arc lamp and to inactivate said primary power circuit during final run operation of said arc lamp.

14. A lighting unit as set form in claim 13 wherein said current maintenance diode is connected between said node and said other supply output terminal, and wherein a control circuit diode is provided connected in series between said gate electrode and the terminal of said first power winding remote from said node, and connected through said first power winding to said node, said control circuit diode being connected in a sense to provide response to potentials in said first power winding representing a voltage transformed from said second power winding during transistor turn-off.

15. A lighting unit as set forth in claim 14 wherein a zener diode is provided connected in series between said gate electrode and said control circuit diode for establishing a voltage threshold for SCR response which is exceeded in warm-up of the arc lamp as the normal arc voltage is approached.

16. A lighting unit as set forth in claim 15 wherein said gate electrode is coupled to said one dc supply terminal through a high impedance for supplying enabling current to said SCR gate when said dc supply is activated, and wherein a storage capacitor is provided having one terminal connected to the interconnection between said zener diode and said control circuit diode and the other terminal connected to said other supply output terminal, the appearance of potentials of the correct polarity and magnitude to forward bias said control circuit diode and exceed the zener potential withdrawing charging current from said gate electrode and turning the SCR off, said capacitor storing the charage to preclude SCR operation throughout the ON time of the solid state switch.

17. A lighting unit as set forth in claim 16 wherein a resistance is provided coupled between said control circuit diode and said one capacitor terminal for establishing a time delay precluding turn-off of said SCR from transients occurring during the glow to arc transition.

18. A lighting unit comprising:

A. a dc power supply having two output terminals;

B. a main arc lamp requiring energization dependent on its electrical state, and C. a filamentary lamp, D. an operating network comprising:

(1) a step-up transformer having a primary winding, a secondary winding and a ferrite core, (2) a solid state switch connected between one of said output terminals and a first node, intermittently operated at an above sonic frequency, (3) a primary power circuit for operating said filamentary lamp comprising said primary winding and said filamentary lamp connected in series between said node and the other said supply output terminal, (4) a secondary power circuit for starting and operating said arc lamp comprising said secondary winding and said arc lamp connected in series between said first node and said othe supply output terminal, said secondary winding providing transformed potentials when said primary circuit is active for starting said arc lamp, and (5) switching means responsive to the state of said arc lamp for turning off said primary power circuit when the arc lamp is warmed up.

19. In a lighting unit having an incandescible filament and an arc lamp which are both to be energized from a dc source, the combination comprising:

(a) a switching device, (b) means for controlling said device to turn it on and off during successive, alternate time periods, (c) a series conduit connectable across said dc source and including two serially connected portions, 1. a first portion including said switching device,
2. the second portion including first and second parallel paths, (d) said first parallel path including said filament, (e) said second parallel path including said arc lamp, and (f) means responsive to current flow through said first path during the on periods of said device for inducing high voltage pulses in said second path, thereby to aid in ignition of an arc within said lamp, said means (f) further including first and second inductively coupled windings serially connected respectively with said filament and arc lamp and forming series components respectively within said first and second parallel paths, the sense of said windings being such that increasing current flow from said dc source through said switching device, first winding and filament induces a voltage in said second winding with a first polarity tending to create anode-to-cathode current in the arc lamp.

20. The combination set forth in claim 19 further characterized in that current maintenance means are connected across the series combination of said first winding and said filament, whereby decrease of current through said first winding when said switching device turns off is constrained to a lower dI/dt so that the amplitude of any resulting voltage, of a second polarity opposite to said first polarity, induced in said second winding is lessened.

21. The combination set forth in claim 19 further characterized in that said first parallel path includes (g) a switch element in series with said first winding and said filament within said first parallel path, and (h) means responsive to current conduction in said second parallel path, when said arc lamp achieves warm-up and steady-run arc conduction, for holding said switch element off, thereby holding said filament deenergized.

22. The combination set forth in claim 19 further including (g) a third parallel path in parallel with said first and second paths, (g1) said third path comprising a unidirectionally conductive element poled to oppose conduction of current which flows from said dc source through said switching device when the latter is on, said element carrying flyback current of either or both the first or the second paths immediately after said switching device turns off.

23. The combination set forth in claim 19 further characterized in that (g) said first and second windings are mounted upon a magnetic core and inductively coupled via a main flux path defined by said core, (h) an aperture in said core separating said main path into first and second regions, and (i) winding means associated with said aperture to sense the onset of main path saturation and to degeneratively turn off said switching device.

24. In a lighting unit which includes (a) a high pressure metal vapor arc lamp, (b) an incandescible filament, (c) a source of dc voltage, (d) a ferrite core transformer having a first power winding on the core and first and second control windings coupled together and associated with the core to detect the onset of a predetermined degree of core saturation, (e) a unidirectional semiconductor switching device having main electrodes and a control electrode with said main electrodes, said first control winding, said power winding, and said arc lamp being connected in series across said dc source, the second control winding being coupled across said control electrode and one of said main electrodes, and (f) means for intermittently turning on said switching device, whereby the first control winding current induces first regenerative and then degenerative feedback signals to the control electrodes to turn off that device, the improvement which comprises in combination (1) a second power winding on said core inductively coupled to said first power winding, (2) a controllable switching unit, (3) means connecting the series combination of said second power winding, said filament and said switching unit in parallel with the series combination formed by said first power winding and said lamp, thereby to form two parallel paths each in series with said switching device and said dc source, (4) said two power windings being sized and wound with senses to constitute means for inducing high voltage pulses in said first power winding in response to current pulses flowing through said second power winding which excite said filament to incandescence when said unit is conductive, whereby high voltage is applied to said arc lamp to start the latter, and (5) means, normally making said unit (30) conductive, but responsive to current flow through said first power winding when the arc lamp reaches a warm-up or run condition, for making said unit non-conductive.

25. The improvement set out in claim 24 further characterized in that said means (5) includes means responsive to the voltage induced in said second power winding, as a consequence of current flowing through said first power winding and arc lamp, for making said unit non-conductive when said arc lamp is conductive in its warm-up or steady-run state.

26. The improvement set out in claim 24 further including (6) a current maintenance element connected in parallel with said two paths with the result that it sustains current through said filament path during the OFF intervals of said switching device when the arc lamp is in pre-ignition and ignition states, and such element sustains current through said arc lamp during the OFF intervals of said switching device during extended times when said unit is non-conductive and the filament is not excited.

* * * * *